United States Patent
Smith et al.

(10) Patent No.: US 12,524,689 B1
(45) Date of Patent: *Jan. 13, 2026

(54) ARTIFICIAL INTELLIGENCE SYSTEM FOR TRAINING A CLASSIFIER

(71) Applicant: Applied Underwriters, Inc., Omaha, NE (US)

(72) Inventors: Justin N. Smith, Belmont, CA (US); David Alan Clark, Elgin, TX (US)

(73) Assignee: Applied Underwriters, Inc., Omaha, NE (US)

( * ) Notice: Subject to any disclaimer, the term of this patent is extended or adjusted under 35 U.S.C. 154(b) by 988 days.

This patent is subject to a terminal disclaimer.

(21) Appl. No.: 17/450,473

(22) Filed: Oct. 11, 2021

Related U.S. Application Data (60) Division of application No. 15/975,840, filed on May 10, 2018, now Pat. No. 11,176,475, which is a continuation-in-part of application No. 15/161,452, filed on May 23, 2016, now Pat. No. 9,971,973, and a continuation-in-part of application No. 14/321,905, filed on Jul. 2, 2014, now abandoned.

(60) Provisional application No. 61/950,912, filed on Mar. 11, 2014.

(51) Int. Cl.
*G06N 5/02* (2023.01)
*G06F 16/355* (2025.01)
*G06N 5/048* (2023.01)
*G06N 7/01* (2023.01)

(52) U.S. Cl.
CPC .............. *G06N 7/01* (2023.01); *G06F 16/355* (2019.01); *G06N 5/02* (2013.01); *G06N 5/048* (2013.01)

(58) Field of Classification Search
None
See application file for complete search history.

(56) References Cited

U.S. PATENT DOCUMENTS

| | | |
|---|---|---|
| 5,745,654 A | 4/1998 | Titan |
| 6,417,801 B1 | 7/2002 | van Diggelen |
| 6,937,187 B2 | 8/2005 | van Diggelen et al. |
| 7,813,944 B1 | 10/2010 | Luk et al. |
| 7,827,045 B2 | 11/2010 | Madill, Jr. et al. |
| 8,024,280 B2 | 9/2011 | Jessus et al. |
| 8,036,978 B1 | 10/2011 | Saavedra-Lim |

(Continued)

OTHER PUBLICATIONS

Tata Consultancy Services Limited and Novarica, Big Data and Analytics in Insurance on Aug. 9, 2012.

(Continued)

*Primary Examiner* — David R Vincent
(74) *Attorney, Agent, or Firm* — Marin Patents LLC; Gustavo Marin (57) ABSTRACT

An artificial intelligence system for training a classifier has a database of training data and a modeling system for building a classification model based on the training data. The database has a binary classification for each entity and binary tokens indicating whether or not one or more indicators about the entity are true. The classification model is based on a tempered indication of the tokens. The tempered indication is a ratio of a weighted sum of the tokens for each entity divided by a tempering factor for each of the entities. The tempering factor is a function of the unweighted sum of the tokens for each entity. Thus, the tempering factor will reduce the tempered indication when large numbers of low weight tokens are present so that the model does not over predict the probability of an entity being in the classification.

9 Claims, 5 Drawing Sheets

(56) References Cited

U.S. PATENT DOCUMENTS

| | | |
|---|---|---|
| 8,041,597 B2 | 10/2011 | Li et al. |
| 8,255,244 B2 | 8/2012 | Raines et al. |
| 8,280,828 B2 | 10/2012 | Perronnin et al. |
| 8,370,279 B1 | 2/2013 | Lin et al. |
| 8,498,931 B2 | 7/2013 | Abrahams et al. |
| 8,521,679 B2 | 8/2013 | Churchill et al. |
| 8,533,224 B2 | 9/2013 | Lin et al. |
| 8,543,520 B2 | 9/2013 | Diao |
| 8,725,660 B2 | 5/2014 | Forman et al. |
| 8,744,894 B2 | 6/2014 | Christiansen et al. |
| 8,799,190 B2 | 8/2014 | Stokes et al. |
| 8,805,769 B2 | 8/2014 | Ritter et al. |
| 8,843,422 B2 | 9/2014 | Wang et al. |
| 8,954,360 B2 | 2/2015 | Heidasch et al. |
| 9,015,089 B2 | 4/2015 | Servi et al. |
| 9,229,930 B2 | 1/2016 | Sundara et al. |
| 10,192,253 B2 | 1/2019 | Huet et al. |
| 2006/0136273 A1 | 6/2006 | Zizzamia et al. |
| 2006/0224492 A1 | 10/2006 | Pinkava |
| 2007/0050215 A1 | 3/2007 | Kil et al. |
| 2007/0282775 A1 | 12/2007 | Tingling |
| 2008/0077451 A1 | 3/2008 | Anthony et al. |
| 2008/0109272 A1 | 5/2008 | Sheopuri et al. |
| 2009/0132445 A1 | 5/2009 | Rice |
| 2009/0208096 A1 | 8/2009 | Schaffer |
| 2010/0063852 A1 | 3/2010 | Toll |
| 2010/0131305 A1 | 5/2010 | Collopy et al. |
| 2010/0145734 A1 | 6/2010 | Becerra et al. |
| 2010/0299161 A1 | 11/2010 | Burdick et al. |
| 2011/0015948 A1 | 1/2011 | Adams et al. |
| 2013/0124447 A1 | 5/2013 | Badros et al. |
| 2013/0226623 A1 | 8/2013 | Diana et al. |
| 2013/0311419 A1 | 11/2013 | Xing et al. |
| 2013/0339220 A1 | 12/2013 | Kremen et al. |
| 2013/0340082 A1 | 12/2013 | Shanley |
| 2014/0058763 A1 | 2/2014 | Zizzamia et al. |
| 2014/0059073 A1 | 2/2014 | Zhao et al. |
| 2014/0114694 A1 | 4/2014 | Krause et al. |
| 2014/0129261 A1 | 5/2014 | Bothwell et al. |
| 2014/0201126 A1 | 7/2014 | Zadeh et al. |
| 2014/0297403 A1 | 10/2014 | Parsons et al. |
| 2015/0032676 A1 | 1/2015 | Smith et al. |
| 2015/0120631 A1 | 4/2015 | Gotarredona et al. |
| 2015/0127591 A1 | 5/2015 | Gupta et al. |
| 2015/0220862 A1 | 8/2015 | De Vries et al. |
| 2015/0242749 A1 | 8/2015 | Carlton |
| 2015/0286930 A1 | 10/2015 | Kawanaka et al. |
| 2018/0373977 A1 | 12/2018 | Carbon et al. |
| 2020/0036750 A1 | 1/2020 | Bahnsen et al. |
| 2020/0320769 A1 | 10/2020 | Chen et al. |

OTHER PUBLICATIONS

Francis Analytics and Actuarial Data Mining, Inc., Predictive Modeling in Workers Compensation 2008 CAS Ratemaking Seminar.
Hendrix, Leslie; "Elementary Statistics for the Biological and Life Sciences", course notes University of South Carolina, Spring 2012.
Roosevelt C. Mosley, Jr., Social Media Analytics: Data Mining Applied to Insurance Twitter Posts, Casualty Actuarial Society E-Forum, Winter 2012—vol. 2.
SAS Institute Inc., Combating Insurance Claims Fraud/How to Recognize and Reduce Opportunisitc and Organized Claims Fraud/ White Paper, 2010.
Tata Consultancy Services, Fraud Analytics Solution for Insurance, 2013.
The Claims Spot, 3 Perspectives On The Use Of Social Media In The Claims Investigation Process dated Oct. 25, 2010, http://theclaimsspot.com/2010/10/25/3-perspectives-on-the-use-of-social-media-in-the-claims-investigation-process/; last viewed Mar. 10, 2014.
Wang, Gary C.; Pinnacle Actuarial Resources, Inc., Social Media Analytics/Data Mining Applied to Insurance Twitter Posts dated Apr. 4, 2013; viewed Apr. 16, 2013.
en.wikipedia.org, Spokeo, last viewed Mar. 10, 2014.
Kolodny, Lora; Gary Kremen's New Venture, Socigramics, Wants to Make Banking Human Again dated Feb. 24, 2012; http://blogs.wsj.com/venturecapital/2012/02/24/gary-kremens-new-venture-sociogramics-raises-2m-to-make-banking-human-again/?mg=blogs-wsj&url=http%253A%252F%252Fblogs.wsj.com%252Fventurecapital%252F2012%252F02%252F24%252Fgary-kremens-new-ventu; last viewed Mar. 10, 2014.
Google Search "read in data", https://www.google.com/?gws_rd=ssl#q="read+in+data", last viewed Mar. 11, 2015.
Curt De Vries, et al., U.S. Appl. No. 61/935,922, "System and Method for Automated Detection of Insurance Fraud" dated Feb. 5, 2014.
International Risk Management Institute, Inc., Event Risk Insurance Glossary, http://www.irmi.com/online/insurance-glossary/terms/e/event-risk.aspx., last viewed Jul. 24, 2015.
Stijn Viaene, ScienceDirect European Journal of Operational Research 176 (2007) 565-583, Strategies for detecting fraudulent claims in the automobile insurance industry, www.elsevier.com/locate/ejor, viewed Oct. 20, 2015.
en.wikipedia.org, Global Positioning System, https://en.wikipedia.org/wiki/Global_Positioning_System, viewed Sep. 26, 2016.
Doanne et al., "Measuring Skewness: A Forgotten Statistic?", Journal of Statistics Education vol. 19, No. 2 (2011), p. 1-18; last viewed Dec. 19, 2014.
Carmel, Lucy; Thelaw.tv., "Social Media's Role in Workers' Comp Claims" dated Feb. 27, 2013; last viewed Dec. 22, 2014.
Scatter Plot Smoothing, https://stat.ethz.ch/R-manual/R-devel/library/stats/html/lowess.html, last viewed Apr. 7, 2016.
en.wikipedia.org, Bayesian network, https://en.wikipedia.org/wiki/Bayesian_network, last viewed Mar. 21, 2016.
en.wikipedia.org, Belief revision, https://en.wikipedia.org/wiki/Belief_revision, lasted viewed Mar. 21, 2016.
en.wikipedia.org, Local regression, https://en.wikipedia.org/wiki/Local_regression, last viewed Apr. 4, 2016.
en.wikipedia.org, Monotonic function, https://en.wikipedia.org/wiki/Monotonic_function, last viewed Mar. 21, 2016.
en.wikipedia.org, Semantic network, https://en.wikipedia.org/wiki/Semantic_network, last viewed Mar. 21, 2016.
en.wikipedia.org, Logistic regression, https://en.wikipedia.org/wiki/Logistic_regression, last viewed Mar. 28, 2016.
en.wikipedia.org, Reason maintenance, https://en.wikipedia.org/wiki/Reason_maintenance, last viewed Mar. 21, 2016.
Viaene et al., European Journal of Operational Research 176 (2007) 565-583; O.R. Applications, Strategies for detecting fraudulent claims in the automobile insurance industry; available online at sciencedirect.com, Available online Nov. 22, 2005.
"Multi-Layer Neural Networks with Sigmoid Function—Deep Learning for Rookies (2)" by Nahua King dated Jun. 27, 2017, https://towardsdatascience.com/multi-layer-neural-networks-with-sigmoid-function-deep-learning-for-rookies-2-bf464f09eb7f last viewed Oct. 28, 2020.

ARTIFICIAL INTELLIGENCE SYSTEM FOR TRAINING A CLASSIFIER

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

Embodiments of the present invention relate to artificial intelligence systems for training classifiers.

BACKGROUND OF THE INVENTION

There are numerous reasons for classifying entities. Binary classification indicates whether or not an entity is in a particular class. Classification can be done based on the publications of an entity. This can include social media publications. The social media publications are analyzed for the presence of indicators. The indicators might be key words. The presence or absence of an indicator might be digitally stored as a binary value of 1 if said indicator is present and a binary value of 0 if said indicator is not present in a particular publication or group of publications. Prior art systems have assigned different weights to different indicators. This recognizes that some indicators are stronger than others. It has been discovered, however, that when there is a large number of low weight indicators in an entity's publications, prior art systems tend to over predict the probability that an entity is in a particular class. There is need, therefore, for an artificial intelligence system for training a classifier that will not over predict due to large numbers of low weight indicators.

SUMMARY OF THE INVENTION

The summary of the invention is provided as a guide to understanding the invention. It does not necessarily describe the most generic embodiment of the invention or the broadest range of alternative embodiments.

A system for training a classifier has a database of training data and a modeling system for building a classification model based on the training data. The database has a binary class for each entity and binary tokens indicating whether or not one or more indicators about the entity are true. The classification model is based on a tempered indication of the tokens. The tempered indication is a ratio of a weighted sum of the tokens for each entity divided by a tempering factor. The tempering factor is a function of the unweighted sum of the tokens for each entity. Thus, the tempering factor will reduce the tempered indication when large numbers of low weight tokens are present so that the model does not over predict the probability of an entity being in a class.

DETAILED DESCRIPTION

The detailed description describes non-limiting exemplary embodiments. Any individual features may be combined with other features as required by different applications for at least the benefits described herein.

As used herein, the term "about" means plus or minus 10% of a given value unless specifically indicated otherwise.

As used herein, a "computer-based system", "computer system", "database" or "engine" comprises an input device for receiving data, an output device for outputting data, a permanent memory for storing data as well as computer code, and a microprocessor for executing computer code. The computer code resident in said permanent memory will physically cause said microprocessor to read-in data via said input device, process said data within said microprocessor, and output said processed data via said output device.

As used herein a "binary value" is any type of computer data that can have two states. Said data may be, but is not limited to, a bit, an integer, a character string, or a floating point number. A binary value of "1" or "true" is interpreted as the number 1 for arithmetic calculations. A binary value of "0" or "false" is interpreted as the number 0 for arithmetic calculations.

As used herein, the symbols "h", "i" and "j" refer to index numbers for one of a plurality of objects. Thus, the term "entity j" refers to a $j^{th}$ entity in a plurality of said entities. The term "token i" refers to an $i^{th}$ token in a plurality of said tokens.

As used herein, the term "adjudicated class" means a classification that has been done independently, at least in some respect, of the data used to train a classifier. For example, referring to FIG. 1, an adjudicator 116, may classify a training entity j 104 into an adjudicated class $C_j$ (item 112) using data that is at least in some way independent of the data (e.g., indicator token i 114) used to train a classifier via modeling engine 120. The adjudicator may be a natural person, an automated system, or a combination of both.

Artificial Intelligence System for Training a Classifier

Figure 1:
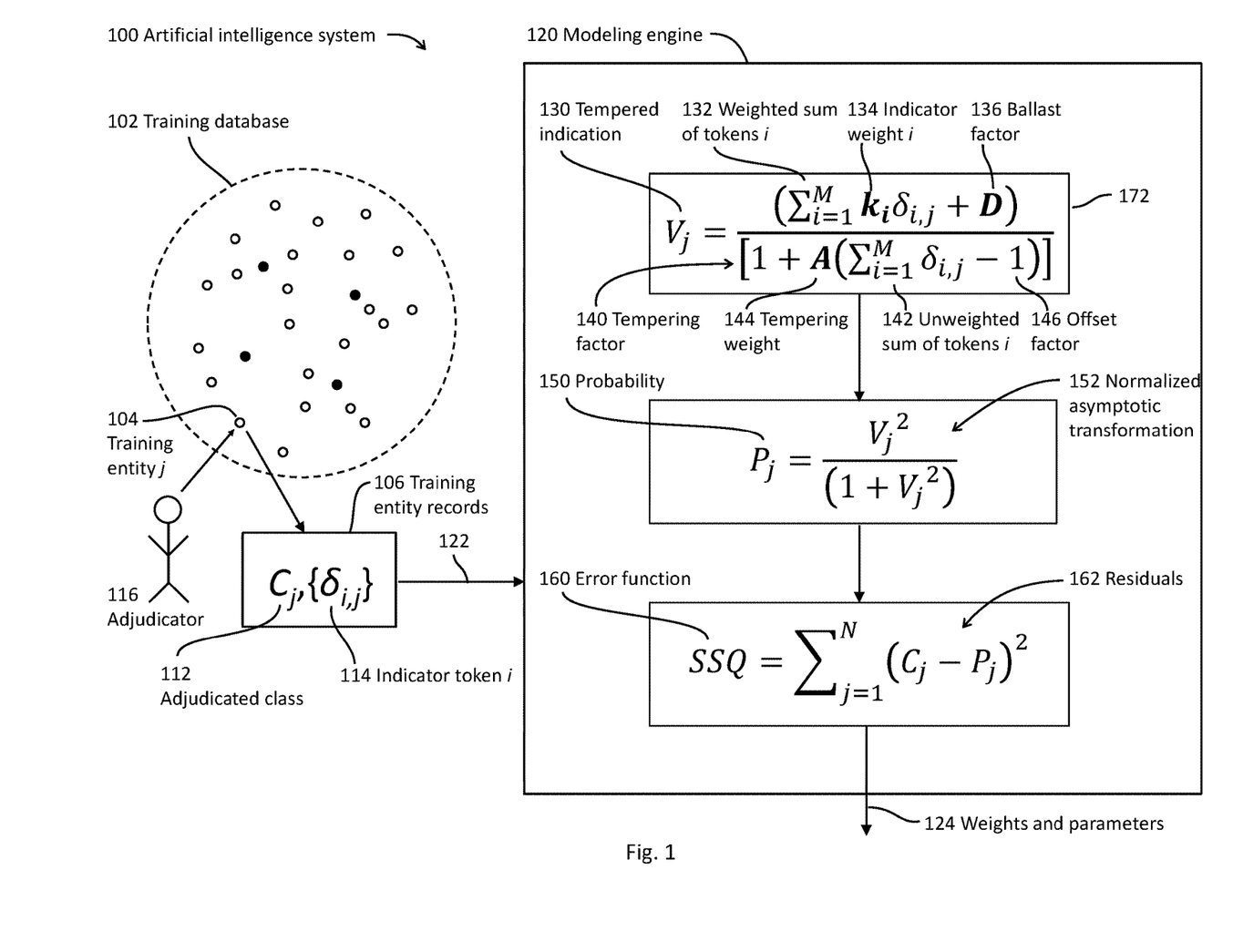
FIG. 1 is an illustration of an artificial intelligence system for training a classifier.

FIG. 1 is an illustration of an artificial intelligence system 100 for training a classifier. The system comprises a computer implemented training database 102 and a computer implemented modeling engine 120. The training database comprises a plurality of N training entity records 106. Each of said records comprises an adjudicated binary class $C_j$ (item 112) of a training entity j (item 104). The binary class has a binary value of 1 when said class is true and a binary value of 0 when said class is false. Each training entity record also comprises a plurality of M indicator tokens i (item 114) for said entity j. "i" is an index number for the different tokens. The total number of tokens is M. "j" is an index number for the different training entities. The total number of training entities is N. $\delta_{i,j}$ represents an indicator token i. $\{\delta_{i,j}\}$ represents the plurality of indicator tokens i for each training entity j.

A token i is a binary indication of the presence or absence of an indicator i in a publication by an entity j. The publication may be a social media publication or any publication under the control of the entity, such as text messages, emails, magazine articles, etc. The indicator may be any aspect of the publication, such as words, phrases, word stems, pictures, videos, font, audio or graphic layout. The token i has a binary value of 1 when said binary indication is true (i.e., the indicator i is present in the publication) and a binary value of 0 when said binary indication is false (i.e., the indicator i is not present in the publication).

The computer implemented modeling engine 120 comprises a microprocessor and computer readable instructions stored on a permanent memory. The computer readable instructions are operable to cause said microprocessor to physically carry out the steps of:

a) read in 122 said plurality of training entity records 106 from said training database 102;

b) calculate by the microprocessor for each training entity j a tempered indication 130 of said class, said tempered indication being based on:
  i) the ratio of a weighted sum 132 of said tokens i associated with said training entity j and a tempering factor 140, said tempering factor being a function of an unweighted sum of said tokens i (item 142) associated with said entity j;
  ii) one or more indicator weights i (item 134) associated with each of said tokens i in said weighted sum; and
  iii) one or more tempering parameters 136, 144, 146 associated with either said weighted sum or said tempering factor;

c) calculate by the microprocessor for each training entity j a probability 150 of said class having a binary value of 1 wherein said calculation of said probability comprises a normalized asymptotic transformation 152 of said tempered indication for said entity j, said normalized asymptotic transformation having an asymptotic value of 1 for large values of said tempered indication;

d) calculate by the microprocessor for each training entity j a residual 162, said residual being the difference between said binary value of said adjudicated class of said entity j and said probability of said class of said entity j having a binary value of 1;

e) calculate by the microprocessor an error function 160 of said residuals for all of said entities j;

f) calculate by the microprocessor values for said indicator weights i and said one or more tempering parameters that minimize said error function; and g) output 124 by the output device said values of said indicator weights i and said one or more tempering parameters in tangible form. Said tangible form may be stored in computer readable format on a permanent memory.

The output 124 may be to an automated classification system that will read in token data for a prospective entity h and use said model for determining a probability of said prospective entity h being in said class. For example, prospective entities might be one or more insurance claimants and their associated insurance claims. The class may be whether or not a claim is fraudulent. Thus, the automated classification system can be used to determine if one or more insurance claims is fraudulent.

FIG. 1 illustrates a particular function 172 for determining a tempered indication, but said invention is not limited to said particular function. Any function that meets the above referenced criteria may be used. In this example, the particular function includes the logic that the tempered indication is set to 0 when none of the indicators are present in a training entity's data (i.e., all of the tokens have a binary value of 0).

The tempering factor has a value of 1 when there is only one indicator found in an entity's data (i.e., the unweighted sum of said tokens i for said entity j has a value of 1). This is set by the offset factor 146.

The formula for the tempered indication shown in FIG. 1 has a tempering weight A. This weight indicates how much the tempering factor increases with each increase in the unweighted sum of the tokens. A value for A of 0.1 or less is suitable. The formula for the tempered indication also has a ballast factor 136 that is added to the weighted sum. The ballast factor may be positive or negative.

In order to compare the tempered indication to a binary class, the tempered indication may be transformed into a real value between 0 and 1 by a normalized asymptotic transformation. A particular normalized asymptotic transformation 152 is shown in FIG. 1. This particular transformation has been found to be effective when the indicators are words, phrases or word stems found in an entity's social media data. This transformation is an example of a long tail transformation relative to a logistic transformation. Any long tail transformation may be effective. The combination of the long tail transformation and the tempering factor substantially reduces the impact of a large number of low weight tokens being in an entity's data.

A particular function 160 is shown for calculating an error function. This function is the unweighted sum of squares (i.e., "SSQ") of the residuals. Any error function, however, may be used that provides an aggregate measure of how well the model fits the data. An alternative error function might be a weighted sum of squares of the residuals where the weights are related to size or importance of the training entities j relative to each other.

Figure 2:
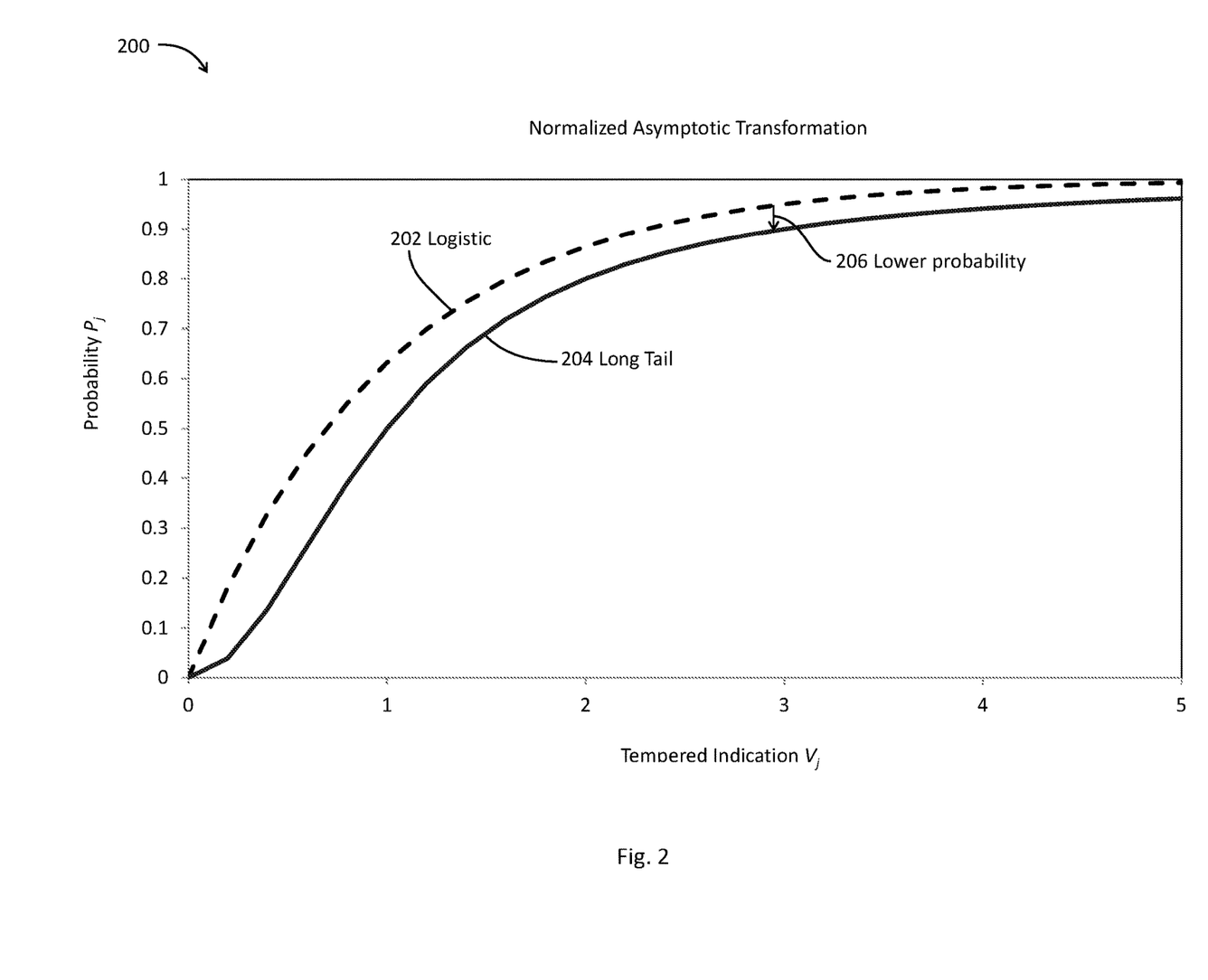
FIG. 2 is a graph of exemplary normalized asymptotic transformations.

FIG. 2 is a graph 200 of two exemplary normalized asymptotic transformations 202 and 204. A logistic transformation 202 is presented in comparison to a long tail transformation 204. As used herein, a normalized asymptotic transformation is long tailed if it has a lower value 206 than the logistic transformation at higher values of the transformed variable (e.g., the tempered indication).

Example I

One of the practical applications of the system for training a classifier is fraud detection in insurance claims. An example of an insurance claim is a workers' compensation insurance claim. Each insurance claim has a claimant. An example of a class for a workers' compensation insurance claim is whether or not the claim is fraudulent.

A set of 100 workers' compensation claimants and associated insurance claims (i.e., training entities j) were adjudicated to determine which claims were legitimate and which claims were fraudulent. The social media sites of the claimants were then analyzed to identify the presence or absence of six words indicative of whether or not said claims were fraudulent. These six words are the indicators i. The class of each training entity j was associated with an event date. The event date was the date a workplace accident occurred that lead to the claimant's insurance claim. The dates of the publications used for each training entity j were after each training entity's event date. The adjudicated classes and indicator tokens were then stored in a training database. A modeling engine then read the data in. The indicator weights i and tempering parameters of a tempered indication were then calculated based on the model (i.e., items 130, 150, 160) shown in FIG. 1.

Figure 3:
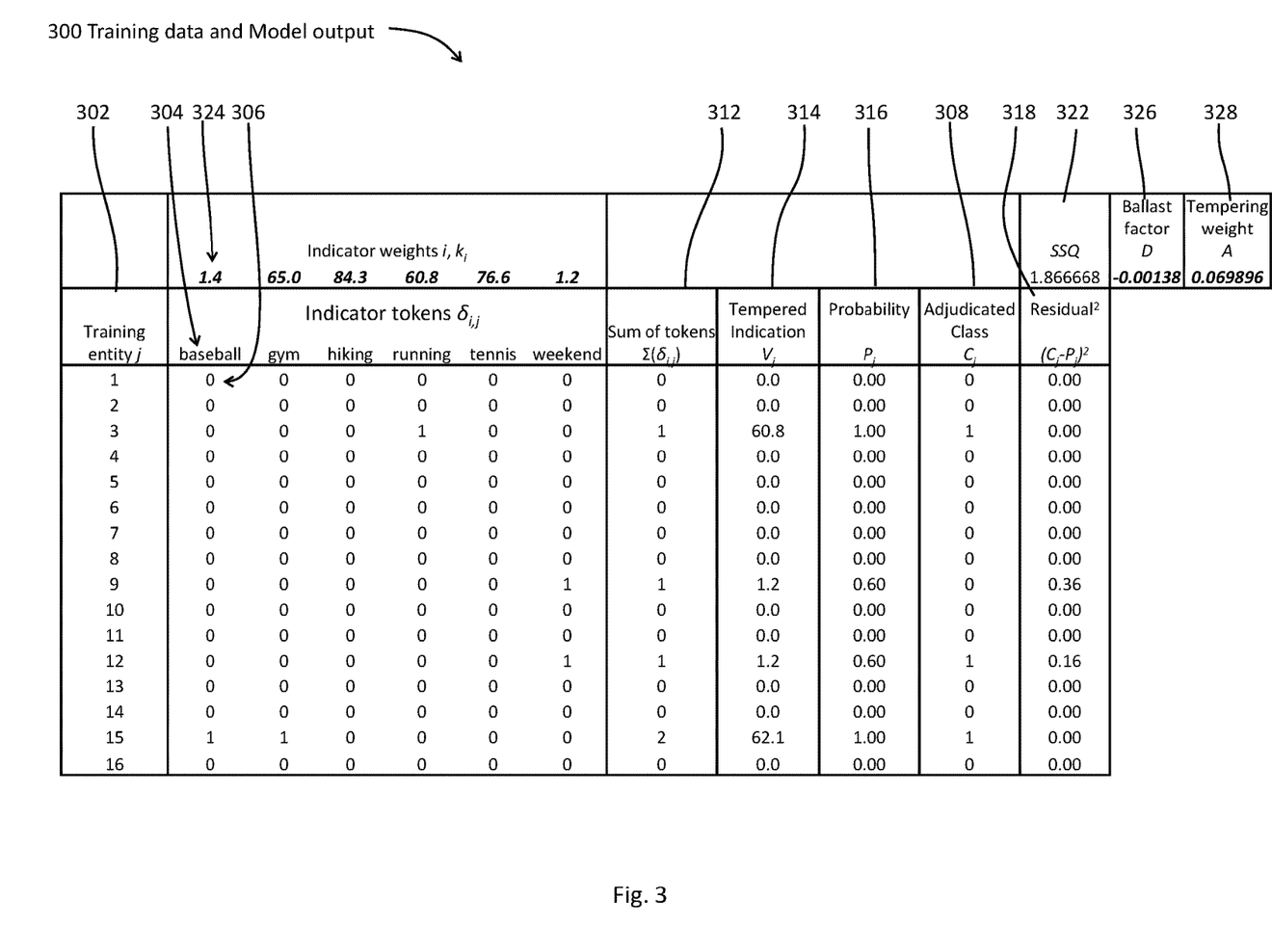
FIG. 3 is an example of the training data and associated output of a modeling system.

FIG. 3 is an example of a portion 300 of the training data and model output of the example. The indicators 304, indicator tokens 306, sum of the indicator tokens 312, and adjudicated classes 308 are shown for a portion of the training entities 302. The calculated indicators weights i 324 and tempering parameters 326 and 328 are shown. The weights and parameters were calculated to minimize the sum of squares 322 of the residuals. The squares of the residuals 318 are shown in the table. The values of the tempered indications 314, and associated probabilities 316 are shown for the calculated indicator weights i and tempering parameters that minimized the sum of squares of the residuals. The indicators of claim fraud and their associated weights that the model selected are consistent with what one would expect for a claimant who might be filing a fraudulent workers' compensation insurance claim. One would not expect a claimant who was injured to be talking about "gym", "hiking", "running", or "tennis" on their social media site if they were truly injured to the point where they couldn't work. Hence these tokens have a high weight. The tokens "baseball", and "weekend" have a low weight since they might indicate that a person is not injured and hence submitting a fraudulent claim (e.g., "I'm going to play baseball this weekend") or they might be consistent with a person being injured and not submitting a fraudulent claim (e.g., "I'm going to watch baseball this weekend").

Figure 4:
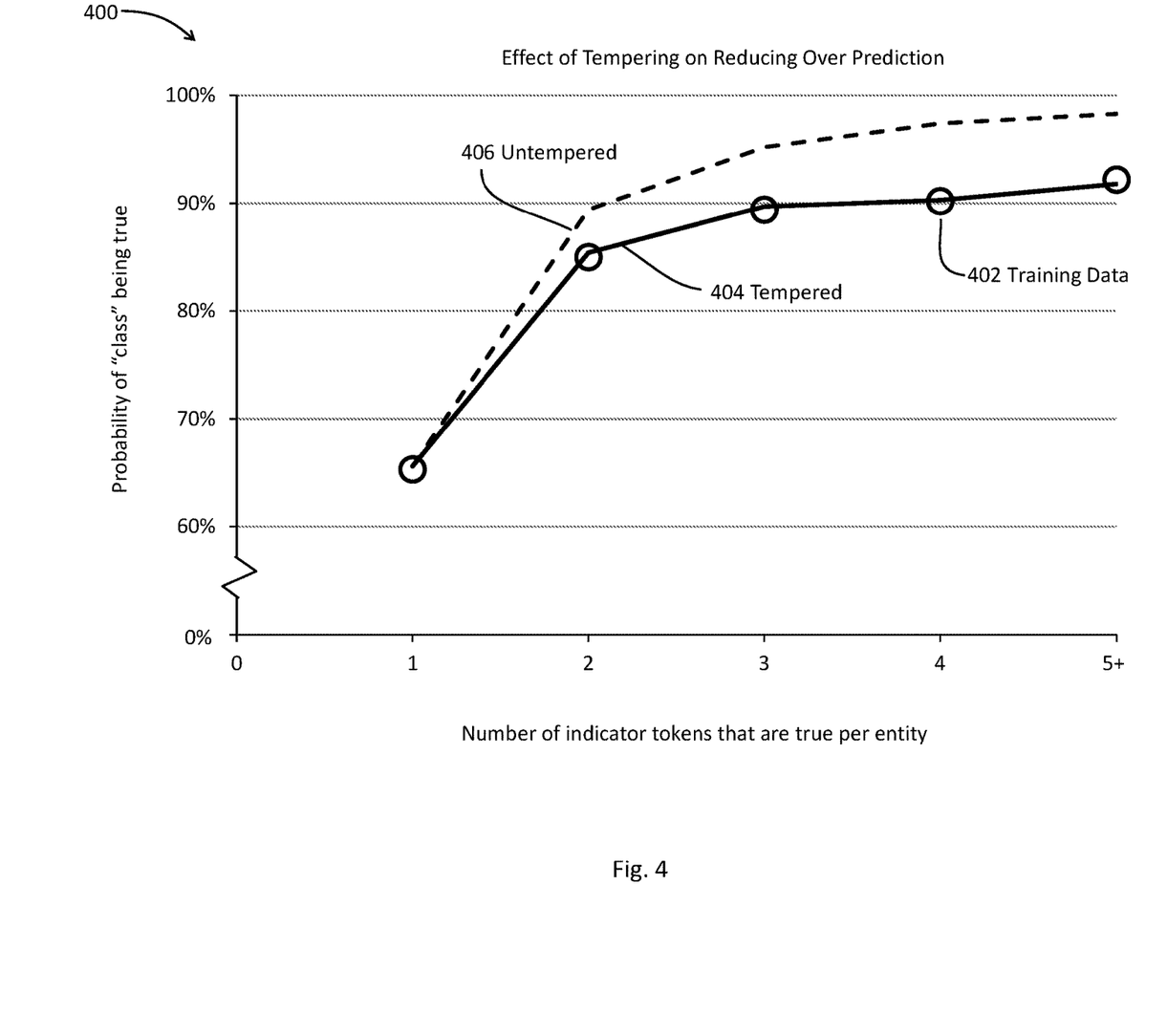
FIG. 4 is a graph showing how tempering reduces over prediction.

FIG. 4 is a graph 400 showing the effect of tempering on reducing over prediction. The probability of an insurance claim being fraudulent (i.e., probability of "class" being true) is shown versus the number of indicator tokens per claim that are true (i.e., binary value=1) per entity. The calculated probabilities 402 based on the actual training data is shown as data points. The probability values 404 calculated according to the tempered model are shown as a solid line. The probability values 406 calculated with an untempered model are shown as a dashed line. (In this example, the model is untempered when the tempering weight 144 is set to zero and the ballast factor 136 is set to zero.) The tempered model shows an accurate 20) prediction of the data points 402. The untempered model over predicts the data points.

Example II

Figure 5:
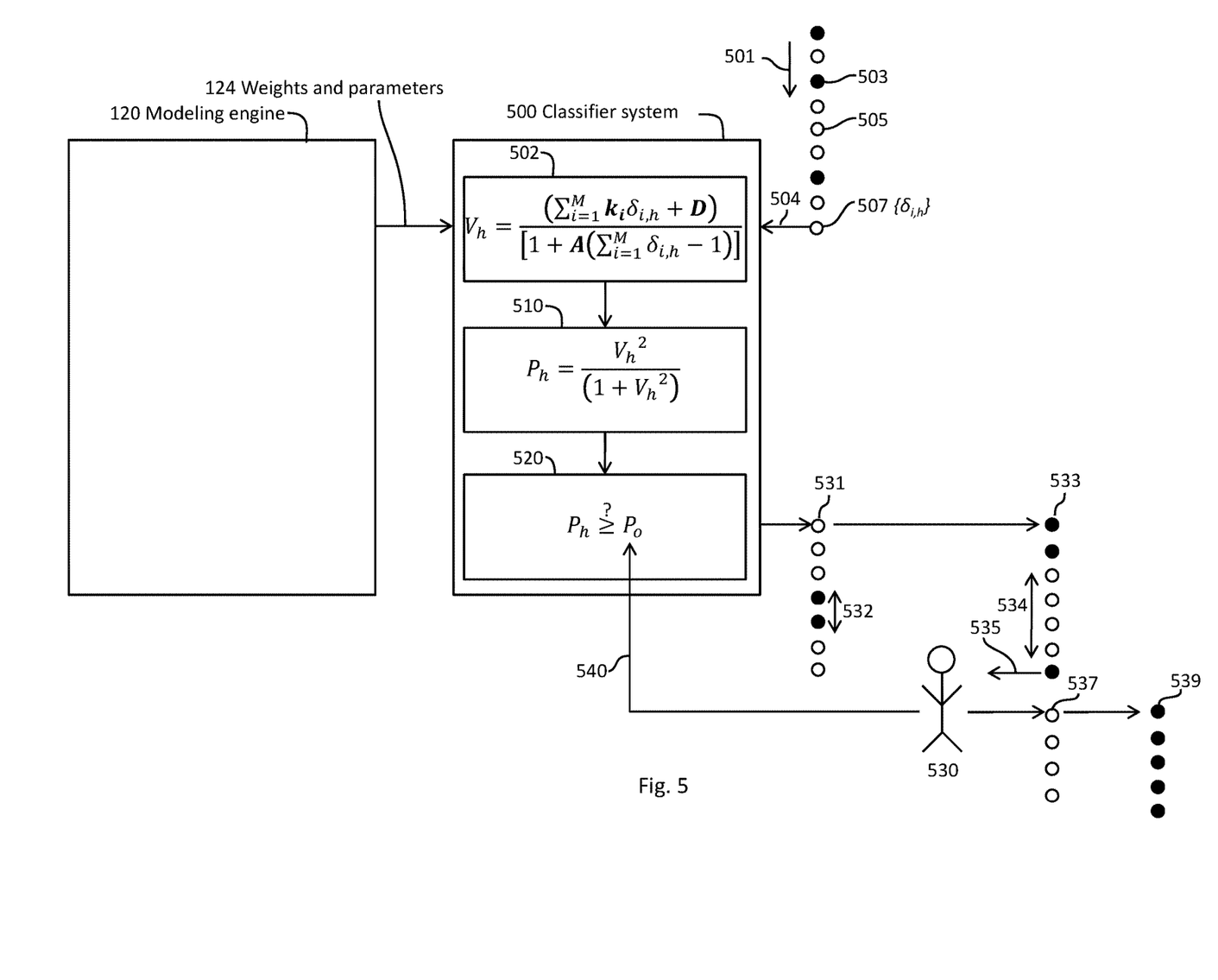
FIG. 5 is an illustration of a classifier system that has been trained.

FIG. 5 illustrates a computer implemented classifier system 500 used to determine if new insurance claims h (item 501) are fraudulent 503 or are not fraudulent 505. Weights and parameters 124 calculated by the modeling engine 120 are transferred to the classifier system. The classifier system reads in 504 a set of indicator tokens $\{\delta_{i,h}\}$ related to a given new claim 507. The classifier system then calculates a tempered indication of fraud $V_h$ using a tempered model 502. The tempered model comprises the weights and parameters produced by the modeling engine.

The classifier system then calculates a probability of fraud $P_h$ using the tempered indication and the asymptotic transformation 510.

The classifier system then compares 520 the calculated probability of fraud $P_h$ with a threshold probability of fraud $P_o$. If the calculated probability of fraud is greater than or equal to the threshold probability, then the claim is flagged 533 for further adjudication. If the calculated probability of fraud is less than the threshold probability, then the claim is deemed not fraudulent 531.

The flagged claims may be reviewed 535 by an adjudicator 530 to make a final determination of whether or not they are fraudulent 539 or not fraudulent 537. Those that are fraudulent are denied for payment. Those that are not fraudulent are approved for payment.

Because the classifier system calculates actual probabilities of fraud, quantitative estimates of the fraction of false positives 534 and false negatives 532 can be made. The threshold probability can then be adjusted 540 to minimize the total cost of unwittingly paying false negative claims 532 that are actually fraudulent and the cost of adjudicating 530 the flagged claims 533 to determine which ones are not fraudulent.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention. For example, the methods described herein may be applied to multi-valued or even scalar classes of entities. They can also be extended to tokens that are scalars, such as the number of times a particular indicator is present in a publication, or the degree to which an indicator is present.

We claim:

1. An artificial intelligence system for training an automated classification system, the artificial intelligence system comprising:
a computer implemented training database comprising a plurality of training entity records, each of the records comprising:
an adjudicated binary class of a training entity j, wherein the binary class is determined by an adjudicator using data independent of tokens used to train the classifier having a binary value of 1 when the class is true and a binary value of 0 when the class is false; and
a plurality of class indicator tokens i for the training entity j, each of the tokens being a binary indication of the presence or absence of an indicator i in a publication by the training entity j, the binary indication having a binary value of 1 when the indication is true and a binary value of 0 when the indication is false; and
a computer implemented modeling engine comprising:
an input device, an output device, a permanent memory, a microprocessor; and
computer readable instructions stored on the permanent memory, which when executed by the microprocessor cause the microprocessor to:
read in, by the input device, the plurality of training entity records from the training database;
process, in parallel using multiple processing threads of the microprocessor to reduce computational processing time compared to sequential, wherein the multiple processing threads execute with interdependent calculations:
a first thread calculating weighted sums of the tokens i;

a second thread calculating unweighted sums of the tokens i; and a third thread calculating tempering factors as functions of the unweighted sums calculated by the second thread;

calculate, by the microprocessor, for each training entity j, a tempered indication of the class, wherein the tempered indication is automatically set to zero when all tokens for the training entity have binary values of zero, the tempered indication being based on:

the ratio of a weighted sum of the tokens i associated with the training entity j and a tempering factor, the tempering factor being a function of an unweighted sum of the tokens i associated with the training entity j;

one or more indicator weights i associated with each of the tokens i in the weighted sum; and one or more tempering parameters associated with either the weighted sum or the tempering factor;

generate a normalized asymptotic transformation of the tempered indication, wherein the transformation has a long tail relative to a logistic transformation and has lower probability values than the logistic transformation at higher values of the tempered indication;

calculate, by the microprocessor, for each training entity j, a probability of the class having a binary value of 1 using the normalized asymptotic transformation;

calculate, by the microprocessor, for each training entity j, a residual, the residual being the difference between the binary value of the class and the probability of the class having a binary value of 1;

calculate, by the microprocessor, an error function of the residuals for all of the entities;

calculate, by the microprocessor, iteratively adjusted values for the indicator weights i and the one or more tempering parameters using gradient descent that minimize the error function; and output, by the output device, the indicator weights i and the one or more tempering parameters in a computer readable form to the automated classification system such that the indicator weights i and one or more tempering parameters can be used by the automated classification system to read in token data for a prospective entity h and use a model based on the indicator weights i and tempering parameters for determining a probability of the prospective entity h being in the class; and wherein the class of each training entity j is associated with an event date, and the publication for each training entity j has a publication date after the training entity j's event date.

2. The artificial intelligence system of claim 1 wherein the tempered indication is set to a value of 0 when all of the tokens for a training entity j have a binary value of 0.

3. The artificial intelligence system of claim 1 wherein the tempering factor is set to a value of 1 when the unweighted sum of the tokens for a training entity j has a value of 1.

4. The artificial intelligence system of claim 3 wherein:
a) the tempering parameters comprise a tempering weight; and
b) the tempering factor increases by the tempering weight when the unweighted sum of the tokens for a training entity j increases by 1.

5. The artificial intelligence system of claim 4 wherein the tempering weight has a value of 0.1 or less.

6. The artificial intelligence system of claim 1 wherein:
a) the tempering parameters comprise a ballast factor; and
b) the ballast factor is added to the weighted sum.

7. The artificial intelligence system of claim 1 wherein the indicators comprise words, phrases or word stems.

8. The artificial intelligence system of claim 1 wherein the error function is a sum of squares of the residuals.

9. The artificial intelligence system of claim 1 wherein:
a) the prospective entity h is a claimant and an associated insurance claim;
b) the adjudicated binary class is a determination of whether or not the insurance claim is fraudulent; and
c) the publication is a social media publication by the claimant.

* * * * *